Nov. 25, 1969 W. F. BIALKO ET AL 3,480,857
DIGITAL METHOD AND APPARATUS FOR MEASURING SMALL
INDUCTANCES AND CAPACITANCES
Filed Dec. 27, 1967

INVENTORS
WILLIAM FRANK BIALKO
BENEDICT ANDREW BOETTCHER

BY *(signature)*

ATTORNEYS

United States Patent Office 3,480,857
Patented Nov. 25, 1969

3,480,857
DIGITAL METHOD AND APPARATUS FOR MEASURING SMALL INDUCTANCES AND CAPACITANCES
William Frank Bialko, Highland, and Benedict Andrew Boettcher, Fishkill, N.Y., assignors to International Business Machines Corporation, Armonk, N.Y., a corporation of New York
Filed Dec. 27, 1967, Ser. No. 693,963
Int. Cl. G01r 27/00, 11/52, 27/26
U.S. Cl. 324—57
10 Claims

ABSTRACT OF THE DISCLOSURE

A method and means for quickly measuring the value of an unknown inductance or an unknown capacitance relative to a known inductance or known capacitance, respectively. An LC circuit forms the tank circuit of an oscillator whose output signal at the resonant frequency of the tank circuit is doubled and applied to the input of an up-down counter. The counter counts cycles of the resonant frequency for a time interval fixed by a predetermined counter. At the end of the time interval, the up-down counter has counted up to the number of cycles occurring in the time interval. If it is desired to measure the value of an unknown inductance the unknown inductance is then connected in series with the known inductance in the tank circuit. If it is desired to test the capacitance of an unknown capacitance, the unknown capacitance is connected in parallel with the capacitor of the tank circuit. After the unknown element is connected into the tank circuit, the oscillator output at its new resonant frequency is doubled and applied to the up-down counter which now counts down for the same time interval so that at the end of the time interval the cycle count stored in the up-down counter equals twice the difference between the two resonant frequencies. The ratio of the value of the unknown element to the value of known element is proportional to the stored count with an accuracy of plus or minus 1% if the ratio of the value of the known element to that of the unknown element is at least 100 and the first resonant frequency can be expressed as $(1+c)10^b$ and the second resonant frequency as $(1 \times d) 10^b$ where $c$ and $d$ are each between 0 and .01, and $b$ is any number. The number $b$ and the value of the unknown element can be chosen such that the stored count is equal to the value of the unknown element in conventional units.

BACKGROUND OF THE INVENTION

Field of the invention

The invention relates to measuring small inductances and capacitances.

DESCRIPTION OF THE PRIOR ART

In the past, inductances and capacitances have been measured by manual inductance or capacitance bridge circuits. The average test time for a given measurement using one of these bridges was 100 seconds. Furthermore, additional time was required for the operator to record the results.

SUMMARY OF THE INVENTION

The broad object of the invention is to provide an improved high speed method and apparatus for measuring small inductances and capacitances so that the total test time will be at least fifty times less for an inductance and a hundred times less for a capacitance than the test time required by prior art bridge testers. The value of an unknown inductance or capacitance is measured by determining the resonant frequency of an LC tank circuit both with and without the unknown element connected in the tank circuit. The ratio of the value of the unknown element to the known element is then directly proportional to the difference of the two resonant frequencies if the following conditions are met: (1) the value of the known element is much greater than the value of the unknown element, and (2) the resonant frequencies can be expressed in the form $(1+c)K$ and $(1+d)K$, where $c$ and $d$ are each $\ll 1$, and $K$ is any number.

BRIEF DESCRIPTION OF THE PREFERRED EMBODIMENTS

Figure 1:
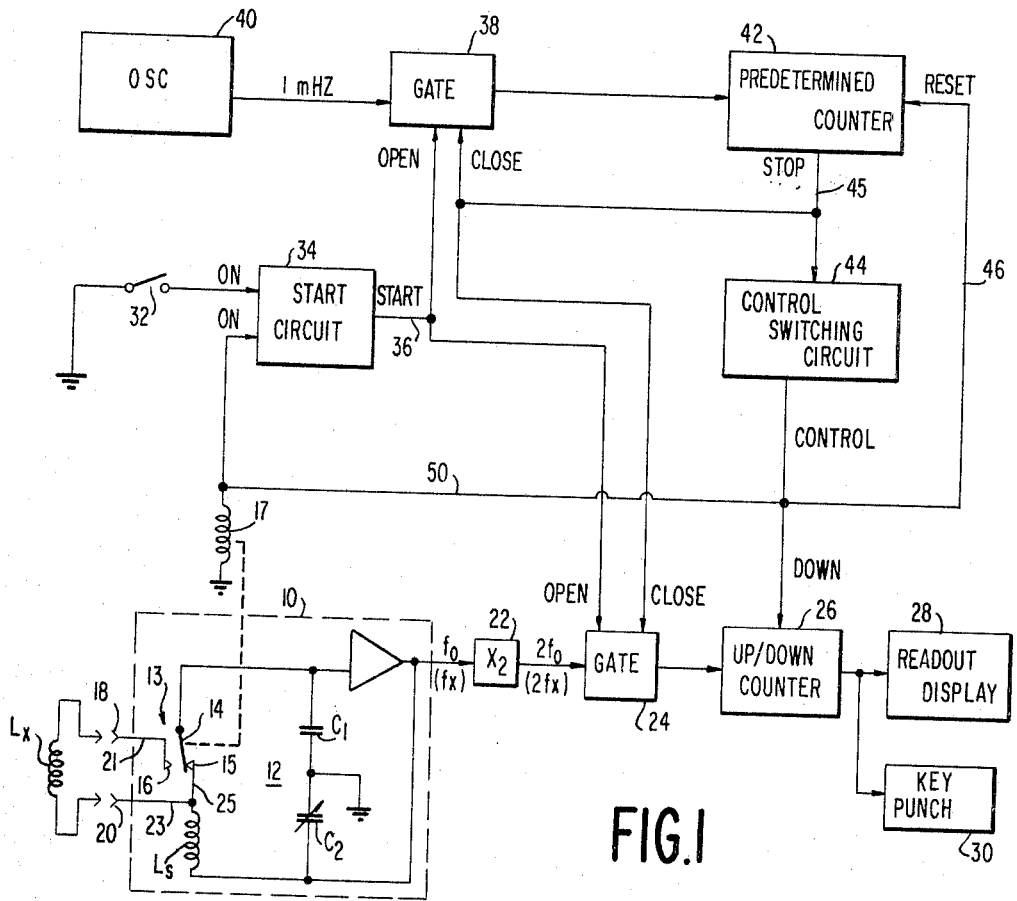
FIGURE 1 is a block diagram of an improved automatic inductance measuring apparatus.

In FIGURE 1, there is illustrated the block diagram of the improved apparatus for measuring a small inductance $L_x$. The apparatus includes a tank-type oscillator 10, such as a Colpitts oscillator, including a tank circuit 12 consisting of a standard inductance $L_s$ whose value is known, a fixed capacitance $C_1$, and a variable capacitance $C_2$. The total effective capacitance of the tank circuit is $C_s$, where $C_s$ can be calculated by the equation $$C_s = \frac{C_1 C_2}{C_1 + C_2}$$

The position of a solenoid-operated transfer switch 13 determines whether $L_x$ is connected into the tank circuit. Switch 13 consists of a movable arm 14 and two fixed contacts 15 and 16. When solenoid coil 17 is not energized, switch 13 is in its normal position with arm 14 closed to contact 15 as illustrated in FIGURE 1. When coil 17 is energized, switch 13 is operated to its test position with arm 14 closed to contact 16. Connected to contact 16 is a pin socket 18 and connected to the junction of contact 15 and $L_s$ is a pin socket 20.

The output frequency of oscillator 10 is doubled by a frequency multiplier 22 whose output is fed through a gate 24 to an up-down counter 26. The output of counter 26 is connected both to a readout display 28 and to a key punch circuit 30.

A normally open test switch 32 is connected to the upper ON input of a start circuit 34 whose output line 36 is connected to the OPEN inputs of both gates 24 and 38. The output of a 1 mHz. oscillator 40 is connected through gate 38 to a predetermined counter 42 which generates a STOP pulse after counting $10^6$ oscillator cycles corresponding to a time interval of one second. This STOP pulse is fed to a control switching circuit 44 and also to the CLOSE inputs of gates 24 and 38. Control circuit 44 energizes relay coil 17 to switch in the unknown inductance $L_x$, conditions counter 26 to operate in the down mode and resets counter 42. Control circuit 44 also energizes the lower ON input of start circuit 34.

In operation, tank circuit 12 is assumed to be initially oscillating freely at a frequency $f_0$ with only the standard inductance $L_s$ in the circuit. The frequency $f_0$ is chosen by adjusting the variable capacitance $C_2$. An unknown inductance $L_x$ is plugged into sockets 18 and 20. At this time, switch 13 is in its normal state, as illustrated, so that the unknown inductance is open-circuited and therefore is not connected in the tank circuit 12. The frequency $f_0$ is equal to $$\frac{1}{2\pi\sqrt{L_s C_s}}$$

and is doubled by multiplier 22 to provide the frequency $2f_0$. Gates 24 and 38 are initially closed and are not opened until a START signal is produced at the output 36 of start circuit 34.

When the test switch 32 is closed, start circuit 34 produces a START pulse which is applied to the OPEN inputs of gates 24 and 38. Gate 24 passes pulses at the frequency $2f_0$ to the input of up-down counter 26 which will now count "up," and gate 38 passes 1 mHz. pulses from oscillator 40 to the input of predetermined counter 42. Counter 42 is designed to count for one second and then send a STOP signal via line 45 to the CLOSE inputs of gates 24 and 38, thereby closing the gates and terminating the counting of both counters 26 and 42. At this time, the pulse count of the signal $2f_0$ for one second is stored in counter 26.

At the same time gates 24 and 38 are closed by the STOP signal from counter 42, control switching circuit 44 is also activated by the STOP signal to generate CONTROL signals. One control signal energizes relay coil 17 thereby transferring switch 13 and connecting the unknown inductance $L_x$. Another control signal is applied as a Down signal to "up"-"down" counter 26 to correct the mode of that counter from addition to subtraction, i.e. from "up" to "down." Another control signal is applied as a RESET signal via line 46 to reset counter 42 to zero. Once the counter 42 is reset, then another control signal is applied via line 50 to the lower input of start circuit 34 to generate another start signal on line 36 to once again open gates 24 and 38 and permit counters 26 and 42 to begin counting again. Counter 26 will now count "down" from the previously stored count. Counter 42 will again count for an interval of one second and then generate a STOP signal. The output of oscillator 10 is now some unknown frequency $f_x$ which is doubled by multiplier 22 to produce a signal at a frequency $2f_x$, where $f_x$ equals $$\frac{1}{2\pi\sqrt{(L_s+L_x)C_s}}$$

The stop signal from the counter 42 once again closes time gates 24 and 38. The stored count in counter 26 is now the difference between the number of pulses counted for one second at the frequency $2f_0$ and the number of pulses counter for one second at the frequency $2f_x$. This readout of $2(f_0-f_x)$ is then fed to a readout display 28 or a key punch circuit 30.

The readout of $2(f_0-f_x)$ is proportional to $L_x/L_s$ with an accuracy of one percent if the following conditions are met: (1) $L_s \geq 100\ L_x$, and (2) $f_0=(1+c)K$ and $f_x=(1+d)K$ where $c$ and $d$ are each less than 0.01, and K is any number.

More specifically, $$\frac{L_x}{L_s}=\frac{2(f_0-f_x)}{K}$$

Therefore, the values of $L_s$ and K may be chosen such that the count $2(f_0-f_x)$ is directly equal to $L_x$ in nanohenries. If K is chosen as $10^5$ so that $f_0=(1+c)10^5$ c.p.s. and $f_x=(1+d)10^5$ c.p.s. and $L_s=100\mu h=10^{-4}$ henries, then the counter readout of $2(f_0-f_x)$ is equal to $L_x$ in nanohenries. If $f_0=101$ kHz.$=(1+.01)10^5$ c.p.s., the maximum inductance that could be accurately tested with a one percent error is 100 nanohenries at 100 kHz.

If the test frequency were changed to one mHz. or $10^6$ c.p.s., then the counter readout would still be in nanohenries if $L_s$ is also changed to one millihenry. However, the maximum inductance $L_x$ that could accurately be tested would be ten microhenries. By manipulating $L_s$ and $f_0$, different limits for $L_x$ are obtainable.

If $L_s$ and K are both made powers of ten, then $L_x$ equals the counter readout, $2(f_0-f_x)$, when the demical point is properly located.

Since the wires 21 and 23 may be quite long, their inductance may influence the initial setting of oscillator 10 when $L_x$ is switched in. To avoid this, inductive balancing is obtained by making the length of wire 25 equal to the combined lengths of wires 21 and 23. The stray capacitance of wires 21 and 23 is very small compared to $C_1$ and $C_2$ and, therefore, may be ignored.

Figure 2:
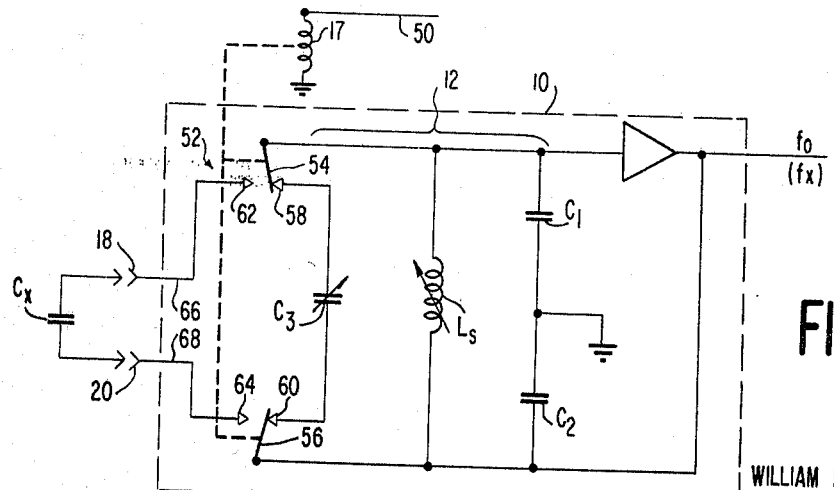
FIGURE 2 illustrates the manner in which the block diagram of FIGURE 1 is modified to permit measuring the capacitance of an unknown capacitor.

FIGURE 2 illustrates the manner in which oscillator 10 of FIGURE 1 is modified to measure an unknown capacitance $C_x$. A known capacitance $C_s$ and a variable inductance $L_s$ form the tank circuit 12 of oscillator 10, where $C_s$ is the net capacitance of $C_1$, $C_2$, $C_3$ and any stray capacitances of the circuit. However, in this case, a solenoid operated switch 52 is connected between tank circuit 12 and pin sockets 18 and 20. Switch 52 consists of two ganged switch arms 54 and 56 which are shown in their normal position when solenoid 17 is not energized. In their normal positions, arm 54 is closed to fixed contact 58 and arm 56 is closed to switch contact 60. The unknown capacitance $C_x$ to be measured is plugged into the sockets 18 and 20. In the normal position of switch 52 capacitance $C_x$ is not connected into the tank circuit 12. However, when solenoid or relay coil 17 is energized by a CONTROL signal from switching circuit 44, switch 52 is operated to close arm 54 to contact 62 and arm 56 to contact 64, thereby connecting capacitance $C_x$ in parallel with the capacitance $C_s$ of the tank circuit 12. The variable capacitance $C_3$ is also removed from the tank circuit at this time. $C_3$ is very small and is adjusted to match the stray capacitance of wires 66 and 68 when $f_0$ is set. The stray capacitance is substituted for $C_3$ when switch 52 is transferred. Without $C_x$ in the circuit, the frequency of oscillator 10 is $$f_0=\frac{1}{2\pi}\sqrt{\frac{1}{L_s C_s}}$$

With $C_x$ in the circuit the frequency $$f_x=\frac{1}{2\pi}\sqrt{\frac{1}{L_s(C_s-C_x)}}$$

The operation of the measuring apparatus of FIGURE 2 is similar to that of FIGURE 1, except in the preferred embodiment the predetermined counter 42 is adjusted to generate a STOP pulse after counting a number of cycles from oscillator 40 corresponding to 100 milliseconds rather than one second. A START signal from start circuit 34 primes the up-down counter 26 to count in its UP mode and also open gates 24 and 38 so that $2f_0$ and 1 mHz. pulses are sent to counters 26 and 42, respectively. When counter 42 counts up to 100 milliseconds, it generates a STOP signal which closes gates 24 and 38, thereby blocking pulses from entering counters 26 and 42. Consequently, counter 26 stores the number $(2f_0)$ of pulses that occur in 100 milliseconds.

The STOP signal also energizes switching circuit 44 to generate a CONTROL signal which is fed along line 50 to energize solenoid 17, thereby closing switch 52 and connecting unknown capacitance $C_x$ in parallel with tank circuit 12. A CONTROL signal is also applied as a DOWN pulse to the up-down counter 26 to change the mode of counting of the counter from UP to DOWN so that the next input to counter 26 from gate 24 will subtract from the stored count. The CONTROL signal also resets counter 42 along line 46. The CONTROL pulse also energizes start circuit 34 to produce a START pulse on line 36 which opens gates 24 and 38. The frequency of oscillator 10 is now $f_x$ which is doubled by doubler 22 and fed through gate 24 so that $2f_x$ is subtracted from the stored count in counter 26 for a 100 millisecond interval determined by $10^5$ cycles or pulses from oscillator 40. At the end of 100 milliseconds, counter 42 produces a STOP signal which closes both gates 24 and 38 so that the count in counter 26 is now the difference between $2f_0$ and $2f_x$, and counter 26 is returned to its UP mode of operation in preparation for the next measurement.

This stored count of $2(f_0-f_x)$ is proportional to $C_x/C_s$ within an accuracy of less than 1% if $C_s \geqq 100\ C_x$, and if $f_0=(1+c)K$ and $f_x=(1+d)K$, where $c$ and $d$ are each less than .01, and K is any number, more specifically $$\frac{C_x}{C_s} = \frac{2(f_0-f_x)}{K}$$

If inductor $L_s$ is adjusted so that $f_0 = 1.01$ mHz. and $C_s = 10,000$ pf., then the maximum capacitance $C_x$ that could be tested with an accuracy of one percent would be 100 pf. With the selected time base of 100 milliseconds the resolution of the readout would be 0.1 pf. $C_s$ and $f_0$ may be manipulated to obtain different limits for $C_x$ and the resolution may be increased by increasing the time base.

While the invention has been particularly shown and described with reference to preferred embodiments there it will be understood by those skilled in the art that various changes in form and details may be made therein without departing from the spirit and scope of the invention.

What is claimed is:

1. A method of measuring the value of an unknown inductance element or capacitance element relative to a known inductance or capacitance element of the same type, respectively, wherein the value of the known element is substantially larger than the value of the unknown element comprising the steps of:
   (a) measuring a first resonant frequency $f_0$ of an LC circuit comprising an inductance element and a capacitive element, one of which is known,
   (b) connecting into said LC circuit an unknown element having reactance of the same type as said known element,
   (c) measuring a second resonant frequency $f_x$ of said LC circuit with said unknown element connected into said LC circuit, where $f_0$ and $f_x$ are in the range such that $f_0=(1+c)K$ and $f_x=(1+d)K$ where $c$ and $d$ are each $\ll 1$, and K is any number,
   (d) determining the difference frequency $(f_0-f_x)$ between said first and second resonant frequencies, and
   (e) determining the ratio of the value of said unknown element to said known element as being proportional to $(f_0-f_x)$.

2. A method as defined in claim 1 further comprising:
   (a) counting and storing as a first count twice the number of cycles of said first resonant frequency $f_0$ for a predetermined time interval,
   (b) counting as a second count twice the number of cycles of said second resonant frequency $f_x$ for said predetermined time interval, and
   (c) reducing said first count by said second count to obtain a difference count equal to $2(f_0-f_x)$ and
   (d) determining the ratio of the value of said unknown element to said known element as being equal to $$\frac{2(f_0-f_x)}{K}$$

3. A method as defined in claim 1 wherein said known and said unknown elements are inductances and further comprising connecting the unknown inductance in series with the known inductance when measuring said second resonant frequency $f_x$.

4. A method as defined in claim 1 wherein said known and said unknown elements are capacitances and further comprising connecting the unknown capacitance reactance in parallel with the known capacitance when measuring said second resonant frequency $f_x$.

5. An apparatus for determining the value of an unknown inductance element or capacitance element relative to a known inductance element or capacitance element, respectively, where the value of the known element is substantially larger than the value of the unknown element, comprising:
   (a) an LC circuit comprising an inductance element and a capacitance element, one of which is known,
   (b) means for measuring a first resonant frequency $f_0$ of said LC circuit,
   (c) means for connecting to said LC circuit an unknown element of the same type as said known element, the value of said known element being substantially larger than the value of said unknown element,
   (d) means for producing a second resonant frequency $f_x$ of said LC circuit when said unknown element is connected to said circuit, where $f_0$ and $f_x$ are in the range such that $f_0=(1+c)K$ and $f_x=(1+d)K$ where $c$ and $d$ are each $\ll 1$ and K is any number, and
   (e) means for obtaining the difference of said first and second resonant frequencies, thereby determining the ratio of the value of said unknown to said known element as being proportional to $f_0-f_x$.

6. An apparatus as defined in claim 5 further comprising:
   (a) means for doubling said first and second resonant frequencies to obtain frequencies $2f_0$ and $2f_x$, respectively,
   (b) an up-down counter,
   (c) means for stepping up said counter at the frequencies $2f_0$ for a predetermined time interval, and
   (d) means for stepping down said counter at the frequency $2f_x$ for an interval equal to said predetermined time interval whereby said counter stores a count equal to $2(f_0-f_x)$ so that the ratio of the value of said unknown to said known element can be determined as $$\frac{2(f_0-f_x)}{K}$$

7. An apparatus as defined in claim 6 further comprising:
   (a) a source of clock pulses,
   (b) a predetermined counter driven by said clock pulses and producing a stop signal at the end of a predetermined number of clock pulses,
   (c) means for generating a start signal,
   (d) means responsive to said start signal to simultaneously initiate operation of said up-down counter and said predetermined counter, and
   (e) means responsive to said stop signal for simultaneous termination of operation of said predetermined and up-down counters.

8. An apparatus as defined in claim 5 wherein said unknown element is an inductance element and further comprising means for connecting said unknown inductance element in series with said known inductance element.

9. An apparatus as defined in claim 5 wherein said unknown element is a capacitance element and further comprising means for connecting said unknown capacitance element in parallel with said known capacitance element.

10. A method of measuring the value of an unknown inductance element or capacitance element relative to a known inductance or capacitance element of the same type, respectively, comprising:
    (a) measuring a first resonant frequency $f_0$ of an LC circuit comprising an inductance element and a capacitance element, one of which is known,
    (b) doubling said frequency $f_0$ to provide a frequency $2f_0$,
    (c) counting the pulses of said frequency $2f_0$ for a predetermined time period to provide a count $C_o$, (d) connecting into said LC circuit an unknown reactance element of the same type as said known element, (e) measuring a second resonant frequency $f_x$ of said C circuit with said unknown element connected into said LC circuit, (f) doubling said frequency $f_x$ to provide a frequency $2f_x$, (g) subtracting the pulses of said frequency $2f_x$ from said count $C_o$ over a like said time period, and (h) determining the ratio of the value of said unknown element to said known value as being proportional to $(f_o - f_x)$.

References Cited

UNITED STATES PATENTS

| | | | |
|---|---|---|---|
| 1,971,310 | 8/1934 | Barber | 324—57 |
| 2,135,017 | 11/1938 | Sharland | 324—60 |
| 2,759,146 | 8/1956 | Heinz | 324—57 |

EDWARD E. KUBASIEWICZ, Primary Examiner

U.S. Cl. X.R.

324—59, 60

UNITED STATES PATENT OFFICE
CERTIFICATE OF CORRECTION

Patent No. 3,480,857  Dated November 25, 1969

Inventor(s) William Frank Bialko and Benedict Andrew Boettcher

It is certified that error appears in the above-identified patent and that said Letters Patent are hereby corrected as shown below:

In the Specification

Column 4, line 43   The formula should read $L_s(C_s + C_x)$
Column 5, line 19   "there" should be -- thereof --

In the Claims

Column 6, line 73   "$2f_o$" should be -- $2f_o$ --
Column 6, line 74   "$2f_o$" should be -- $2f_o$ --
Column 7, line 5    "C circuit" should be -- LC circuit --
Column 7, line 8    "$2f_x$" should be -- $2f_x$ --
Column 7, line 9    "$2f_x$" should be -- $2f_x$ --

SIGNED AND SEALED
JUN 9 1970

(SEAL)
Attest:

Edward M. Fletcher, Jr.
Attesting Officer

WILLIAM E. SCHUYLER, JR.
Commissioner of Patents